United States Patent [19]

Wilhelmson

[11] 3,834,586

[45] Sept. 10, 1974

[54] FLUID MEASURING AND DISPENSING SYSTEM

[75] Inventor: Jack L. Wilhelmson, Fenton, Mo.

[73] Assignee: Sherwood Medical Industries, Inc., St. Louis, Mo.

[22] Filed: June 2, 1971

[21] Appl. No.: 149,299

[52] U.S. Cl.............. 222/47, 23/253 R, 222/148, 222/309, 222/373
[51] Int. Cl............................................. B67d 5/54
[58] Field of Search ........ 23/253 R; 222/14, 16, 21, 222/43, 47, 51, 148, 309, 373, 439, 440, 442

[56] References Cited
UNITED STATES PATENTS

| 759,827 | 5/1904 | McCallum | 222/373 |
|---|---|---|---|
| 2,580,256 | 12/1951 | Tacchella | 222/309 X |
| 2,631,137 | 3/1953 | Bruce et al. | 222/16 |
| 3,186,800 | 6/1965 | Strickler | 23/253 R |
| 3,430,812 | 3/1969 | Leo et al. | 222/14 |
| 3,502,118 | 3/1970 | Assalit | 222/373 X |

Primary Examiner—Robert B. Reeves
Assistant Examiner—Thomas E. Kocovsky
Attorney, Agent, or Firm—Stanley N. Garber; William R. O'Meara

[57] ABSTRACT

Liquid which is to be measured and dispensed flows through an inlet port into the bore of a vertical measurement tube, forcing a free piston upward. A plurality of sensors are vertically located along the tube. When the sensor enabled by a liquid volume selector detects the free piston, a solenoid driven valve piston moves to block the inlet port and opens a discharge port. Purge gas, entering at the top of the tube bore, is now effective to force the free piston downward and dispense the liquid. After the free piston has forced all liquid out of the tube, a gas passageway couples the purge gas in the tube bore to the discharge port, simultaneously purging the measurement tube and the discharge port.

14 Claims, 3 Drawing Figures

PATENTED SEP 10 1974 3,834,586

INVENTOR.
JACK L. WILHELMSON
BY Hofgren, Wegner, Allen, Stellman & McCord.
ATTORNEYS.

FLUID MEASURING AND DISPENSING SYSTEM

This invention relates to an improved and greatly simplified system for measuring and dispensing selected quantities of fluid.

Many fluid measuring and dispensing systems have been devised for rapidly dispensing a selected volume of fluid sample, such as a liquid reagent. When used in automatic chemical analyzers, for example, such measuring and dispensing systems must be capable of delivering a precise, highly accurate volume of liquid. In addition, the system should be self-priming, and manufacturable almost entirely of plastic, glass and other materials which have low reaction rates with the liquids which are to be dispensed.

To improve accuracy in measurement, some dispensing systems switch the discharge line to a purge gas source in order to purge the delivery line of all liquid. However, no provision is made for gas purging the liquid from the measuring chamber to the delivery line.

In accordance with the present invention, an improved fluid measuring and dispensing system is disclosed which uses a minimum number of parts readily formed of plastic and glass materials having a low reaction rate with the fluids to be dispensed. The fluid sample to be dispensed is selected by digital coded electrical signals which control a simple two cycle pump. The selected sample volume is accurately dispensed by a positive displacement piston constructed to allow purge gas to bypass the piston at the end of the discharge cycle.

One object of this invention is to provide a fluid measuring and dispensing system of simplified construction, few moving parts, and highly accurate dispensing of selected volumes of fluid.

Another object of this invention is to provide an improved measuring system which allows purge gas to flow uninterruptedly through a measuring chamber and a discharge line.

Further features and advantages of the invention will be apparent from the following description, and from the drawings, in which.

Figure 1:
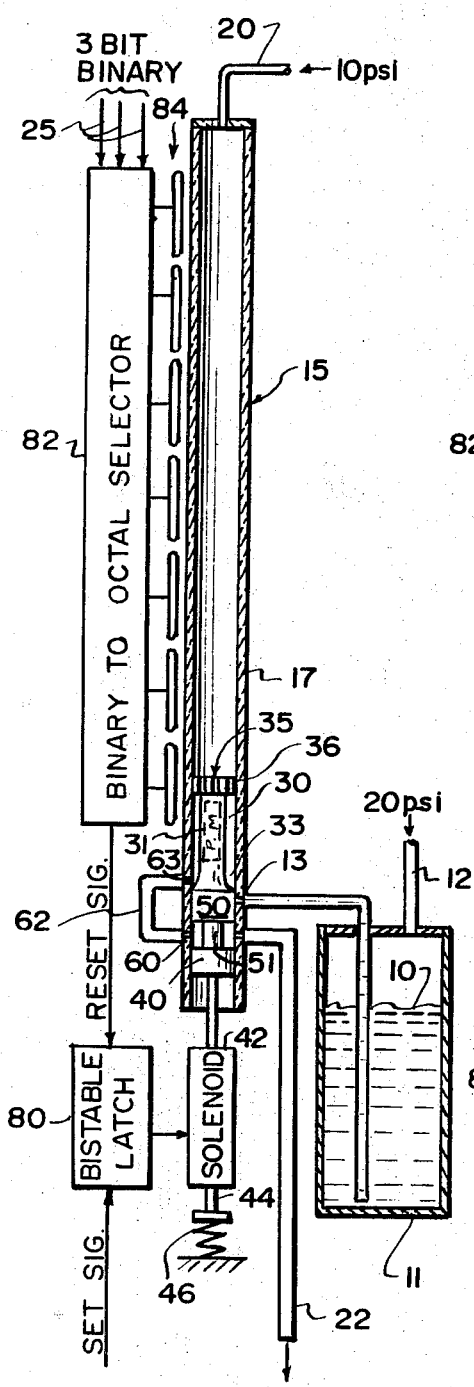
FIG. 1 is a partly schematic and partly sectional diagram of the novel fluid measuring and dispensing system, illustrated during a rest or unenergized state.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

As seen in FIG. 1, a liquid 10 which is to be repeatedly dispensed with different selectable volumes, such as a reagent used in an automatic chemical analyzer, is contained in a receptacle or reservoir 11 having a compressed air line 12 connected to a source of compressed gas, at a pressure, for example, of 20 psi. The pressure of the gas forces the liquid through an input port 13 (when open) to a measuring and dispensing pump 15. The pump 15 comprises a vertically extending precision bore glass tube 17 having an open bottom end, and a generally closed top end with a gas port connected through a purge gas line 20 to a source of compressed or pressurized gas, at a pressure, for example, of 10 psi. A discharge line 22, of any desired length, connects the pump chamber to an automatic chemical analyzer, or other apparatus requiring variable volumes of liquid 10. The exact volume for a given sample which is to be dispensed is selected by a 3 bit binary number, generated by any suitable digital computing equipment (not illustrated), and available on a plurality of electrical input lines 25.

A free or floating piston 30, having a permanent magnet 31 embedded therein, is slidably retained within the hollow bore or measuring chamber of tube 17. Piston 30 has a flared bottom skirt 33 which forms a close, fluid tight fit in the tubing bore. The central portion of the free piston 30 is reduced in diameter, forming an annular recess or cavity for passage of purge gas, as will appear. The upper portion of piston 30 comprises an enlarged head 35 having a plurality of small grooves 36 vertically extending to allow passage of purge gas around head 35 to the annular central cavity.

Figures 2, 3:
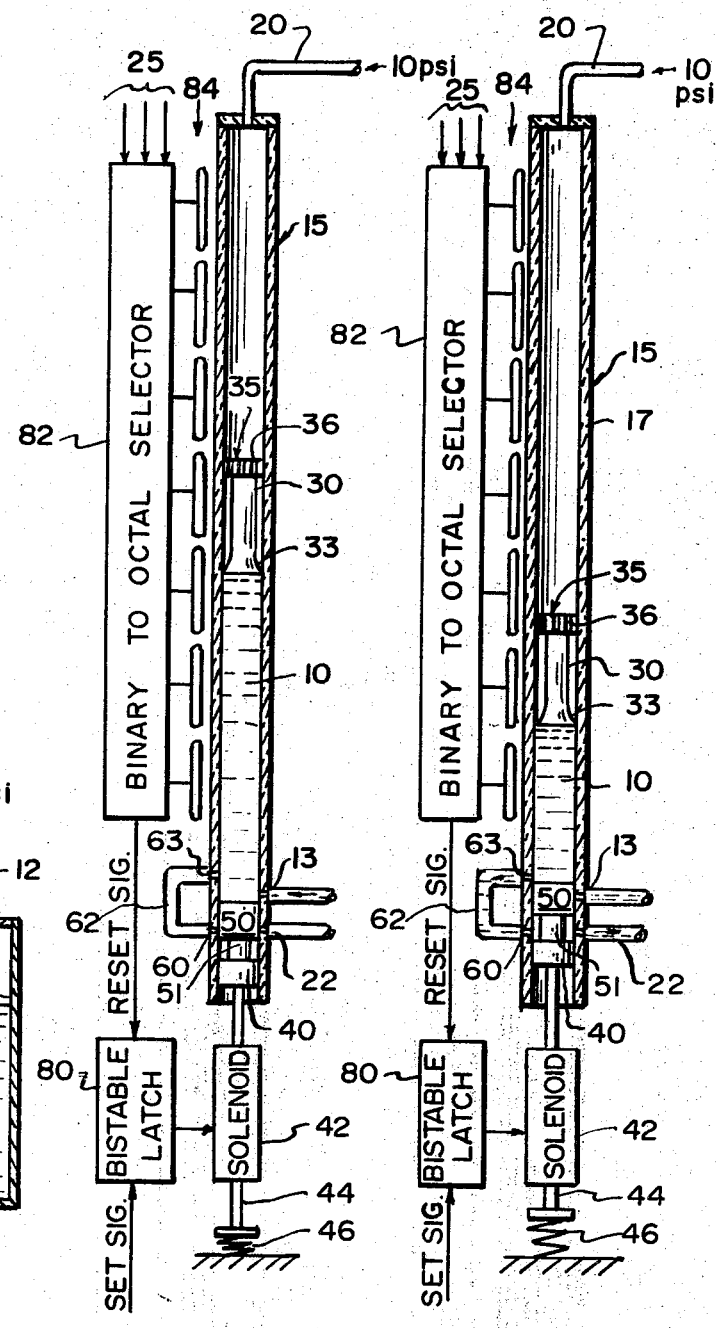
FIG. 2 is a diagram illustrating the pump of FIG. 1 during a fill cycle.
FIG. 3 is a diagram illustrating the pump of FIG. 1 during a delivery cycle.

To control the fill and discharge cycles of the pump, a valve piston 40 is slidably received within the bore of glass tube 17. Valve piston 40 is maintained at either one of two positions, as controlled by a solenoid 42. A solenoid shaft 44 extends through solenoid 42 and, at its upper end, is permanently affixed to valve 40, and at its lower end, compresses a return spring 46. The solenoid shaft 44 and hence valve piston 40 normally assume an uppermost position, as illustrated in FIGS. 1 and 3. When solenoid 42 is energized, solenoid shaft 44 is driven downward against the return spring 46, causing the valve piston 40 to assume a lowermost position, as illustrated in FIG. 2.

Valve piston 40 has an upper head 50 which forms a fluid tight fit in the tubing bore. A central valve piston shaft 51, of reduced diameter, allows passage of liquid 10 and purge gas through opposed ports leading to discharge line 22. Opposite the port for discharge line 22 is a lower bypass port 60 of a bypass line 62 having an upper bypass port 63 opening to the measurement tube chamber. Upper bypass port 63 is vertically positioned slightly above the inlet port 13 so that valve piston head 50 will block inlet port 13, but will not block bypass port 63, when solenoid 42 is not energized.

At the termination of every delivery cycle, pump 15 is empty of fluid, solenoid 42 is not energized, and the system assumes the position illustrated in FIG. 1. Head 50 of valve piston 40 blocks the liquid supply line 13, causing free piston 30 to be forced down against the upper face of head 50 by the pressure of purge gas which passes from gas inlet line 20 and through the tubing bore against the free piston. A portion of the purge gas also passes through and into the annular cavity formed by the central reduced shaft 51. The cavity is contiguous with bypass port 63, causing purge gas to flow via bypass line 62 and around the reduced shaft 51 to the delivery line 22. Thus, whenever the tube chamber is empty of liquid 10, purge gas flows continuously from the purge gas source and through the pump bore to delivery line 22, producing a continuous output stream of pressurized gas.

To initiate a fill cycle, signals representing a 3 bit binary number are coupled to electrical input lines 25, and a cycle start signal is supplied to the set input of a bistable latch 80. The electrical input lines 25 are connected to a binary-to-octal selector 82 which converts the 3 bit binary number into a single octal or decimal equivalent which energizes or enables an associated gate. The output of all electrical gates are tied to a common reset line for bistable latch 80. The input of each gate is connected to an associated liquid level sensor 84, herein a magnetic proximity switch which is closed when the permanent magnet 31 embedded in the free piston 30 is located adjacent thereto. Each sensor 84 is located at a different vertical position along the tube 17, corresponding to different volumes of liquid 10 in tube 17. When the sensor 84 which is connected to an enabled gate detects the presence of a magnetic field, a signal is passed to the reset line of bistable latch 80, deenergizing the latch and terminating the fill cycle.

When latch 80 is first energized, its electrical output actuates solenoid 42, moving valve piston head 50 downward until it closes lower bypass port 60 and the outlet port of the discharge line 22. At the same time, movement of the head 50 opens the inlet port 13. Since the liquid in reservoir 11 is pressurized by gas at a greater pressure than the pressure of the purge gas, the liquid 10 is forced through inlet port 13 and into the measuring chamber. As seen in FIG. 2, the free piston 30 follows the rising level of the fluid 10, due to the greater pressure of the rising liquid. The pump measuring chamber continues to fill until the embedded permanent magnet moves adjacent the sensor 84 connected to the gate in selector 82 which is enabled by the 3 bit number on line 25. The resulting output resets bistable latch 80, terminating the fill cycle and initiating the delivery cycle.

As liquid enters the measuring chamber, the purge gas in bypass line 62 is trapped by closure of port 60, thus causing only a small quantity of liquid to enter the bypass line. Each energization of a new cycle causes the same amount of liquid to enter the bypass line, which amount can be subtracted from the volume capacity of tube 17 when locating the sensors 84 so as to accurately calibrate the apparatus.

As bistable latch 80 is reset, the energizing signal for solenoid 42 is terminated and compressed return spring 46 returns solenoid shaft 44 to its deenergized position, FIG. 3. This raises the valve piston head 50, opening the lower bypass port 60 and the port of the discharge line 22, and closing the inlet port 13. No further fluid from the reservoir 11 can now enter the measuring chamber.

As inlet port 13 is closed, the differential pressure on the free piston 30 is reversed, causing the pressure of the purge gas from line 20 to force the free piston 30 downward. The liquid is forced through the upper bypass port 63 and bypass line 62 to the lower bypass port 60, and then through the center cavity of the valve piston to the port of discharge line 22. Liquid flows out of the discharge line 22 with a pressure equal to the pressure of the purge gas. This action continues until the positive displacement of free piston 40 forces all liquid out of the measuring chamber.

As the free piston 40 abuts the face of valve piston head 50, FIG. 1, the flared bottom skirt 33 passes the upper bypass port 63, causing purge gas to flow through the upper bypass port 63, forcing all liquid out of the discharge line 22 and finally resulting in the flow of purge gas out the delivery line. Because purge gas flows completely through the measuring chamber, even the smallest residual quantities of liquid are forced out of the measuring chamber and to the delivery line. The pump has now returned to its unactuated state, FIG. 1, completing the delivery cycle.

Various modifications can be made following the teachings of the invention. The pump is suitable for dispensing liquids or gases. If desired, the embedded permanent magnet 31 can be eliminated and the magnetic sensors 84 can be replaced by light activated sensors, such as photocells receiving a light beam transmitted through the glass tubing 15. The valve piston 40 could be actuated by a double acting solenoid 42, replacing the return spring 46. Delivery line 22 can be any length, allowing remote location of the pump mechanism which is especially advantageous when corrosive fluids are being handled. Other changes will be apparent to those skilled in the art.

I claim:

1. A system for measuring and dispensing a selectable quantity of fluid, comprising: chamber means for measuring quantities of fluid; fill means operative for filling said chamber means with a selected quantity of fluid; purge gas means for supplying a purge gas to said chamber means; output line means for supplying under pressure said selected quantity of fluid from said chamber means; said chamber means containing a free piston in fluid sealing engagement therewith and driven by said purge gas against said selected quantity of fluid to force said fluid to flow through said chamber means to said output line means; and control means for permitting said selected quantity of fluid and said purge gas to flow through both said chamber means and said output line means to concurrently purge said chamber means and said output line means of fluid.

2. The system of claim 1 including coupling means effective after said free piston has driven substantially all of said selected quantity of fluid through said chamber means for effectively opening said output line means to the flow of said purge gas which drove said free piston.

3. The system of claim 2 wherein said chamber means includes surface means against which said free piston is driven by said purge gas, output port means connecting said output line means to said chamber means at a location adjacent said surface means, and said coupling means includes a gas passageway means formed in said free piston to open said output port means through said chamber means to said purge gas means when said free piston is driven against said surface means.

4. The system of claim 3 wherein said chamber means includes an input port means for receiving fluid from said fill means, said surface means comprises a movable valve piston located in said chamber means, and said control means includes means for moving said valve piston to close said input port means and locate said valve piston spaced from said output port means.

5. The system of claim 3 wherein said free piston comprises a fluid tight portion for forcing said fluid through said chamber means and a head portion spaced therefrom and facing said purge gas means, said gas passageway means includes slot means formed in said head portion for passing purge gas to cavity means located between said fluid tight portion and said head portion, said cavity means being located adjacent said output port means when said free piston is driven against said surface means.

6. A system for measuring and dispensing a selectable quantity of fluid, comprising: chamber means for measuring quantities of fluid; fill means operative for filling said chamber means with a selected quantity of fluid; purge gas means for supplying a purge gas to said chamber means; output line means for supplying under pressure said selected quantity of fluid from said chamber means; control means for permitting said selected quantity of fluid and said purge gas to flow through both said chamber means and said output line means to concurrently purge said chamber means and said output line means of fluid; and a member in said chamber movable in accordance with the quantity of fluid therein; said fill means including a plurality of sensor means spaced along said chamber means at locations representing different quantities of fluid in said chamber means for detecting the presence of said member when said member is adjacent thereto, and selector means responsive to a selected one of said sensor means for terminating the supply of fluid to said chamber means.

7. The system of claim 6 wherein said selector means enables said control means immediately upon terminating the supply of fluid to said chamber means.

8. The system of claim 7 including valve piston means movable within said chamber means, said chamber means includes an input port for opening said chamber means to the supply of fluid and an output port for opening said chamber means to said output line means, and means enabled by said selector means for moving said valve piston means from a position blocking said output port to a position blocking said input port.

9. A liquid measuring and dispensing system, comprising: fluid container means including a fluid outlet port for alternately dispensing liquids and gases, a gas inlet port spaced from said fluid outlet port for admitting gas, and a measurement chamber located between said spaced ports for holding selectable volumes of liquids; gas means for supplying a pressurized gas to said gas inlet port; discharge means coupled to said fluid outlet port and passing pressurized gas flowing through said measurement chamber when empty of liquid; a liquid inlet port in said container for admitting liquid to said measurement chamber; fill means connected to said liquid inlet port for filling said measurement chamber with a selected volume of liquid under pressure; and control means including valve means having a first state effective to open said liquid inlet port and block said fluid outlet port to supply said liquid to said measurement chamber while said pressurized gas is supplied to said measurement chamber from said gas inlet port, and a second state effective to block said liquid inlet port and open said fluid outlet port to permit said pressurized gas to drive said selected volume of liquid in said measurement chamber through said outlet port and said discharge means until the measurement chamber is empty of liquid and allow the pressurized gas to pass through the discharge means, and cycle means for selecting the first and second states of said valve means.

10. The system of claim 9 wherein said fluid container means comprises an elongated tube having between a pair of end tube portions a hollow interior defining said measurement chamber, said gas inlet port being located at one end tube portion, said fluid outlet port and said liquid inlet port being located at the other end tube portion, said valve means comprises a piston movable within said hollow interior to alternately block and open the ports at said other end tube portion.

11. A liquid measuring and dispensing system, comprising: fluid container means including a fluid outlet port for alternately dispensing liquids and gases, a gas inlet port spaced from said fluid outlet port for admitting gas, and a measurement chamber located between said spaced ports for holding selectable volumes of liquids; gas means for supplying a pressurized gas to said gas inlet port; discharge means coupled to said fluid outlet port and passing pressurized gas flowing through said measurement chamber when empty of liquid; fill means for filling said measurement chamber with a selected volume of liquid; said fluid container means including a piston movable within said measurement chamber and in sealing engagement therewith for positively displacing the selected volume of liquid in said measurement chamber under control of said pressurized gas, and control means for permitting said pressurized gas to drive said selected volume of liquid in said measurement chamber through said fluid outlet port and said discharge means until said measurement chamber is empty of liquid and allowing the pressurized gas to pass through said discharge means.

12. The system of claim 11 wherein said fluid container means includes bypass means for passing pressurized gas around at least a portion of said piston when said measurement chamber is empty of liquid.

13. The system of claim 12 wherein said piston comprises a slidable member having a fluid tight element facing the fluid outlet port and a pressure head element facing the gas inlet port, and said bypass means includes a gas passageway from said pressure head element to a gas opening means located intermediate said elements, said gas opening means being adjacent said fluid outlet port when said measurement chamber is empty of liquid.

14. The system of claim 13 wherein said fluid container means includes surface means against which said fluid tight element is driven when said measurement chamber is empty, said fluid outlet port being located adjacent said surface means, and said gas opening means comprises a recess in said slidable member.

* * * * *